Sept. 3, 1968    E. C. ROLLINS    3,399,766
COMBINATION CLEANER AND CONVEYOR FOR HARVESTERS
Filed Feb. 10, 1966
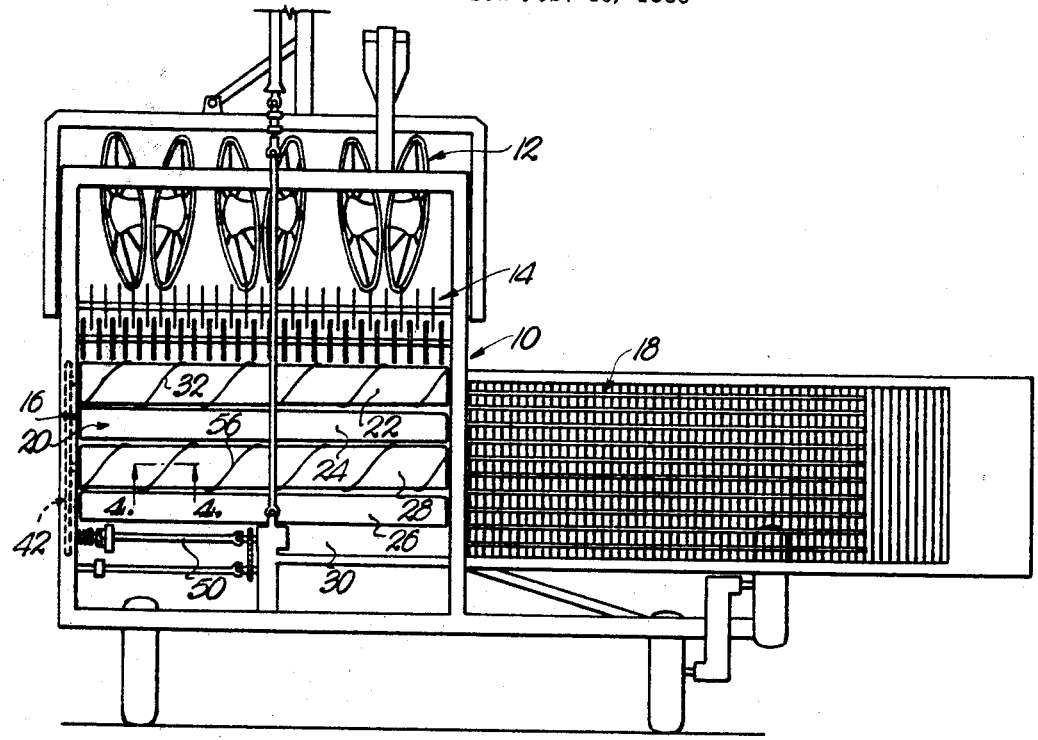
Fig. 1.
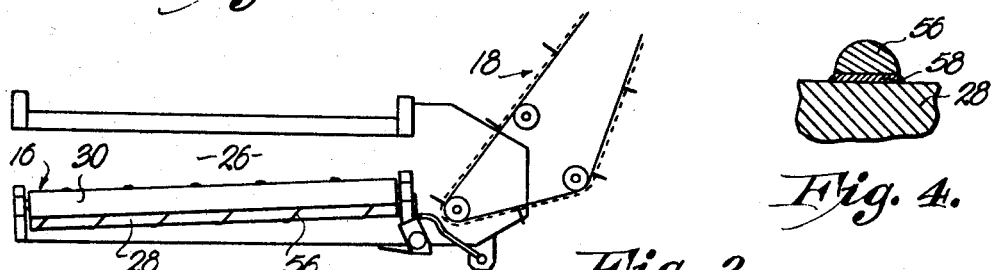
Fig. 2.
Fig. 4.
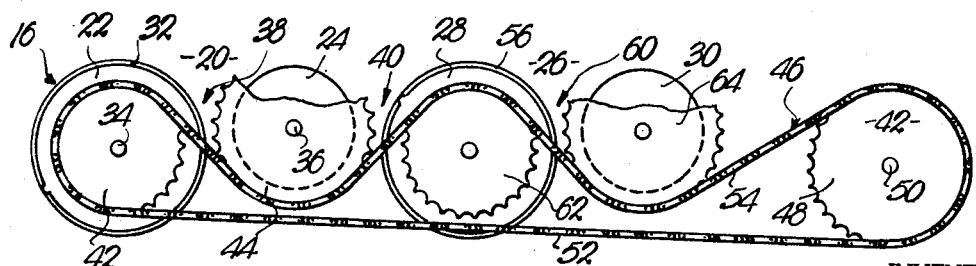
Fig. 3.
INVENTOR
Eugene C. Rollins
BY Hovey, Schmidt, Johnson & Hovey
ATTORNEYS

United States Patent Office 3,399,766
Patented Sept. 3, 1968

3,399,766
COMBINATION CLEANER AND CONVEYOR
FOR HARVESTERS
Eugene C. Rollins, Ogden, Utah, assignor to Hesston
Manufacturing Company, Inc., Hesston, Kans., a corporation of Kansas
Filed Feb. 10, 1966, Ser. No. 526,520
5 Claims. (Cl. 209—107)

ABSTRACT OF THE DISCLOSURE

A beet cleaning conveyor including a series of rolls, spaced to present beet-receiving troughs therebetween, and rotatable about horizontal axes that slope upwardly toward the beet discharge end of the conveyor, with alternate rolls having helical flighting for both transverse and longitudinal advancement of the beets. The flighted rolls have larger diameters than those of the smooth rolls and are rotated in the direction of transverse beet flow, but faster than the rate of rotation of the smooth rolls. The smooth rolls are rotated against transverse beet flow and have their upper surfaces in a common horizontal plane with the upper surfaces of the flighted rolls.

---

This invention relates to the handling of products in a manner to remove waste and foreign material therefrom, in the nature of a cleaning conveyor, especially adapted for use in connection with a harvester such as those used in the lifting, elevation and advancement of beets to a point of collection.

The primary object of the instant invention is to provide a beet cleaning conveyor in the nature of side-by-side rolls made and arranged in a manner to more effectively remove trash, mud, clods and the like therefrom than has heretofore been possible in the many and varied roller assemblies heretofore suggested.

In carrying out the aforementioned object there is provided in my instant invention a roll arrangement and construction such that there is an adequate differential in the peripheral velocities of each pair of adjacent rolls, operating in conjunction with a trough therebetween within which the beets are conveyed having a relatively high squeeze point. Moreover, there is provided a differential in diameters between the adjacent rolls of each pair with the helical flight for conveying and dirt removal purposes wound on the larger roll so as to properly and effectively move the beets in a proper direction not only longitudinally but transversely of the rolls, thereby increasing capacity, avoiding damage to the harvested crop and scrubbing the beets between the rolls to remove dirt and mud therefrom in total absence of substantial packing.

In the drawing:

FIGURE 1 is a fragmentary view of one type of beet harvester with which the present invention may be used showing my novel beet cleaning conveyor in plan; FIG. 2 is a fragmentary schematic view illustrating the combination cleaner and conveyor for harvesters about to be described in side elevation; FIG. 3 is an enlarged fragmentary end view of the conveyor depicting the drive therefor; and FIG. 4 is a fragmentary, detailed, cross-sectional view still further enlarged taken along line 4—4 of FIG. 1.

The beet harvester chosen for illustration of the principles of my present invention is broadly designated by the numeral 10 in the drawing, including the usual lifting wheels 12 for raising the beets from the ground. The harvested beets are received by conventional rienks 14 where most of the soil and trash is eliminated. The beets are then received by the cleaning conveyor broadly designated by the numeral 16 and constituting the improvements of my present invention. The beets are then received at one end of the conveyor 16 by an elevator 18 for advancement to a point of collection, not shown.

The harvester 10 moves forwardly through the field in a direction opposite to the direction of beet flow from the rienks 14 to the conveyor 16, and therefore, transversely to the axes of rotation of the plurality of rolls forming the cleaning conveyor 16. Accordingly, the beet travel from the conveyor 16 to the elevator 18 is likewise transversely to the path of travel of the harvester 10.

The beet cleaning conveyor 16 includes a primary unit 20 having a pair of side-by-side rolls 22 and 24 and a secondary unit 26, identical with the unit 20, and therefore, having a pair of rolls 28 and 30 of the same nature as rolls 22 and 24 respectively.

Manifestly, any number of pairs of rolls may be employed as desired but, keeping cost and space requirements in mind, it has been found that the two units 20 and 26 are quite adequate for most multiple row beet harvesters presently in universal use.

As illustrated, all of the rolls are elongated, transversely circular, in spaced apart relationship and preferably in parallelism. Roll 24 is somewhat smaller in diameter than the roll 22 and has a smooth outer surface throughout its length whereas the roll 22 is provided with helical flighting 32. The rolls are all longitudinally inclined as illustrated in FIG. 2 with the upper ends thereof at their discharge zone adjacent the elevator 18. Transversely the upper surfaces of the rolls are in a common plane that is horizontal transversely of the units 20 and 26. That is to say disregarding the flighting 32 the upper surface of the roll 22 should be at least as high as the upper surface of the roll 24. As shown in FIG. 3, this places the axis 34 of rotation of the roll 22 lower than the axis 36 of rotation of the roll 24.

By virtue of the construction and arrangement above described, there is presented a relatively shallow beet receiving trough 38 between the rolls 22 and 24, presenting a higher squeeze point than that which is made possible when the roll 24 is of the same large diameter as that of the roll 22. The provision of a relatively shallow taper in the trough 38 causes the beets to ride relatively high as distinguished from a long deep taper which tends to pull the beets downwardly between the rolls, causing the beets to be smashed and otherwise damaged. The spacing between the rolls 22 and 24 at the apex of the trough 38 should be preselected in accordance with average beet size, but it is to be pointed out that the construction and arrangement of the unit 20 is such as to permit inclusion in the harvester 10 of means to vary the distance between the rolls 22 and 24. The spacing 40 between rolls 24 and 28 is not critical; moreover, the drive 42 for the rolls is of such nature as to permit such variance as conditions may require.

The peripheral velocity of the roll 22 is not only made greater than that of the roll 24 because of differences in diameters but by virtue of the differences in rotational speeds. To this end, sprocket wheel 42 for the roll 22 is greater in diameter than that of the sprocket wheel 44 for the roll 24. The entire arrangement thus far described permits use of a drive 42 in the nature of that illustrated in FIG. 3, which is relatively simple and inexpensive, having a continuous chain 46 looped around a sprocket wheel 48 secured to a drive shaft 50. Chain 46 has a straight stretch 52 and a serpentine drive stretch 54 trained over the sprocket wheel 42 and under the sprocket wheel 44. The drive sprocket 48 rotates clockwise, viewing FIG. 3, rotating the roll 22 in the same direction and rotating the roll 24 counterclockwise.

Helical flighting 56 for the roll 28, which may be identical with the flighting 22 as above indicated, is desirably made from a rod that is split as shown in FIG. 4 and then built up throughout its length with a bar 58 to eliminate all crevices or grooves adjacent the surface of the roll 28 within which material might build up and to prevent the beets from hanging up by virtue of their tails becoming wedged in such grooves or crevices. It has been found satisfactory to form the flighting 56 from one inch stock and to thereupon provide an approximate ⅝" height in the flighting throughout its length by the addition of the bar 58.

While dimensions, speeds and velocities are not highly critical, good results can be expected if the rolls 24 and 30 are approximately 5" in diameter with the rolls 22 and 28 having diameters of approximately 6½". The diameters chosen for the sprocket wheels 44 and 48 are 6¼" as compared with a diameter of about 5¼" for the sprocket wheel 42. The rolls 22 and 28 are driven at approximately 700 revolutions per minute as compared with 540 revolutions per minute for the roll 24. Accordingly, the peripheral velocity of the rolls 22 and 28 of 1,042 feet per minute is appreciably greater than that of the rolls 24 and 30 found to be satisfactory at substantially 707 feet per minute.

An aggressive action will be imparted to the beets by the roll 22, quickly and positively removing the beets from the rienks 14 without damage to the beets, the latter moving transversely of the conveyor 16 over the top of the roll 22 and into the trough 38 of the primary unit 20. Since rolls 22 and 24 rotate inwardly toward each other in opposite directions, the tendency is for the beets to be pulled downwardly into the trough 38, but since they do ride relatively high in the shallow trough 38, there will be no pinching or crushing; on the other hand, an effective scrubbing action will take place to remove dirt and mud therefrom without packing the latter on the beets as is normally experienced in the use of conventional roll type cleaning conveyors.

The dirt as well as rocks, leaves, trash and other debris will gravitate through the open bottom of trough 38 as the beets are tumbled and conveyed toward the elevator 18, the inclination shown in FIG. 2 for the units 20 and 26 impeding such advancement of the beets sufficiently to effect adequate cleaning prior to discharge onto the elevator 18.

At the same time, the gripping action on the beets between rolls 22 and 24 will operate to cause them to overflow into the space 40 transversely of and over the top of the roll 24, whereupon the roll 28 in conjunction with roll 24 (rotating in opposite directions away from each other) will cause the beets to move over the roll 28 and into trough 60 of the secondary unit 26. Roll 28 has the same aggressive action on the beets as the roll 22 in causing such delivery of the beets from the space 40 to the trough 60, and as a consequence, the entire conveyor 16 operates to deliver the beets to the elevator 18 from the discharge ends of the troughs 38 and 60. Here again, sprocket wheels 62 and 64 cause rotation of the rolls 28 and 30 respectively in opposite directions, inwardly toward each other, with differential rotational speed and differential peripheral velocities the same as above explained with respect to the primary unit 20.

Having thus described the invention, what is claimed as new and desired to be secured by Letters Patent is:

1. In a beet cleaning conveyor, a primary unit comprising the combination of:
    a pair of elongated, transversely circular rolls, arranged to present a beet-receiving trough disposed therebetween and extending longitudinally thereof;
    means mounting the rolls for rotation about their longitudinal axes,
    said rolls being disposed in spaced relationship to present an open bottom for said trough through which waste material may gravitate from the conveyor while the rolls retain the beets in the trough;
    means driving the rolls inwardly toward each other in opposite directions at different rotational speeds whereby the peripheral velocity of one of the rolls is greater than that of the other roll,
    the diameter of said one roll being greater than that of said other roll whereby to maintain said trough relatively shallow and to further increase the differential in the peripheral velocities of the rolls;
    helical flighting on said one roll arranged to receive beets fed to the one roll therealong and move the same thereover transversely of the one roll into the trough, and to advance the beets within said trough in one direction longitudinally of the latter,
    the upper surface of said one roll throughout its length being at least as high as that of the other roll whereby said flighting tends to cause the beets to overflow from the trough over the other roll transversely of the latter; and
    a secondary unit identical with said primary unit having its larger roll disposed alongside said other roll of the primary unit for receiving beets overflowing over said other roll of the primary unit and feeding the same into the trough of the secondary unit,
    the upper surfaces of all rolls being in a common plane that is horizontal transversely of the units and inclined longitudinally of the units with the upper ends of the rolls at the discharge zone of the beets from the troughs.

2. In a beet cleaning conveyor, a primary unit comprising the combination of:
    a pair of elongated, transversely circular rolls, arranged to present a beet-receiving trough disposed therebetween and extending longitudinally thereof,
    one end of the trough being the beet outlet end of said unit;
    means mounting the rolls for rotation about their longitudinal axes,
    said rolls being disposed in spaced relationship to present an open bottom for said trough through which waste material may gravitate from the conveyor while the rolls retain the beets in the trough;
    means driving the rolls inwardly toward each other in opposite directions at different rotational speeds whereby the peripheral velocity of one of the rolls is greater than that of the other roll,
    the diameter of said one roll being greater than that of said other roll whereby to maintain said trough relatively shallow and to further increase the differential in the peripheral velocities of the rolls; and
    helical flighting on said one roll arranged to receive beets fed to the one roll therealong and raise the same thereover transversely of the one roll into the trough, to advance the beets within said trough in one direction longitudinally of the latter and to discharge the beets from said unit at said outlet end thereof,
    said driving means rotating the one roll in the direction of transverse beet flow and rotating the other roll against said transverse beet flow.

3. The invention of claim 2,
    the upper surfaces of said rolls being in a common plane that is horizontal transversely of the unit.

4. The invention of claim 2,
the upper surface of said one roll throughout its length being at least as high as that of the other roll whereby said flighting tends to cause the beets to overflow from the trough over the other roll transversely of the latter; and
a secondary unit identical with said primary unit having its larger roll disposed alongside said other roll of the primary unit for receiving beets overflowing over said other roll of the primary unit and feeding the same into the trough of the secondary unit.

5. The invention of claim 4,
the upper surfaces of all rolls being in a common plane that is horizontal tranversely of the units and inclined longitudinally of the units with the upper ends of the rolls at the outlet ends of the units

References Cited
UNITED STATES PATENTS

| | | | |
|---|---|---|---|
| 2,618,385 | 11/1952 | Silver et al. | 209--107 |
| 2,997,086 | 8/1961 | Armer | 209—106 X |
| 3,283,895 | 11/1966 | Rollins | 209—107 |

ALLEN N. KNOWLES, *Primary Examiner.*